(12) United States Patent
Lange et al.

(10) Patent No.: US 9,733,637 B2
(45) Date of Patent: *Aug. 15, 2017

(54) METHOD AND APPARATUS FOR AUTOMATED CONFIGURATION OF A MONITORING FUNCTION OF A MACHINE TOOL

(71) Applicant: ARTIS GmbH, Egestorf (DE)

(72) Inventors: Dirk Lange, Lueneburg (DE); Dirk Euhus, Neuenkirchen (DE); Frank August Joachim Bonas, Fintel (DJ)

(73) Assignee: ARTIS GmbH, Egestorf (DE)

(*) Notice: Subject to any disclaimer, the term of this patent is extended or adjusted under 35 U.S.C. 154(b) by 333 days.

This patent is subject to a terminal disclaimer.

(21) Appl. No.: 13/890,544

(22) Filed: May 9, 2013

(65) Prior Publication Data
US 2013/0304248 A1 Nov. 14, 2013

(30) Foreign Application Priority Data
May 11, 2012 (DE) .......................... 10 2012 207 916

(51) Int. Cl.
*G05B 19/18* (2006.01)
*G05B 19/4097* (2006.01)

(52) U.S. Cl.
CPC .......... *G05B 19/18* (2013.01); *G05B 19/4097* (2013.01); *G05B 2219/23031* (2013.01); *Y02P 90/265* (2015.11)

(58) Field of Classification Search
CPC .......... G05B 2219/13004; G05B 2219/13012; G05B 2219/13017; G05B 2219/13022; G05B 2219/13025; G05B 2219/13028; G05B 2219/13068; G05B 2219/13097; G05B 2219/13109; G05B 2219/13155;
(Continued)

(56) References Cited

U.S. PATENT DOCUMENTS 5,023,800 A * 6/1991 Carver et al. ................. 700/182
5,295,059 A * 3/1994 Brooks et al. .................. 700/18
(Continued)

FOREIGN PATENT DOCUMENTS

DE      102 22 521 A1    12/2003
DE      102007014271      10/2007
(Continued)

OTHER PUBLICATIONS

Computerized Manufacturing Automation: Employment, Education, and the Workplace, Washington, D.C.: U.S. Congress, Office of Technology Assessment, OTA-CIT-235, Apr. 1984, p. 48.*

*Primary Examiner* — Kenneth M Lo
*Assistant Examiner* — Michael J Huntley
(74) *Attorney, Agent, or Firm* — Meyertons Hood Kivlin Kowert & Goetzel, P.C.; Jeffrey C. Hood

(57) ABSTRACT

System and method for automated provision of a monitoring function for a machining process which is to be executed by a machine tool. A computer-aided manufacturing (CAM) program of the machining process is automatically analyzed by means of a postprocessor in order to determine processing steps to be monitored. At least one monitoring instruction may be automatically inserted into a control program of the machine tool by the postprocessor, wherein the control program is executed during the machining process.

25 Claims, 11 Drawing Sheets

(58) Field of Classification Search
CPC ........... G05B 2219/13172; G05B 2219/13173;
G05B 2219/13174; G05B 2219/13189;
G05B 2219/32001; G05B 2219/45064;
G05B 19/4097; G05B 2219/23031; G05B
19/18; Y02P 90/265
USPC ................................................ 700/103, 175
See application file for complete search history.

(56) References Cited

U.S. PATENT DOCUMENTS

| | | | | |
|---|---|---|---|---|
| 6,799,080 | B1* | 9/2004 | Hylden | ................ G05B 19/409 340/3.1 |
| 6,819,960 | B1* | 11/2004 | McKelvey et al. | ............. 700/17 |
| 2002/0120921 | A1* | 8/2002 | Coburn | ............ G05B 19/41885 717/140 |
| 2003/0023341 | A1* | 1/2003 | Sagawa | ............... G05B 19/4093 700/159 |
| 2003/0144753 | A1* | 7/2003 | Otani et al. | ...................... 700/87 |
| 2006/0100719 | A1* | 5/2006 | Jarrett et al. | .................... 700/28 |
| 2007/0156278 | A1* | 7/2007 | Hiraga | ................. G05B 19/406 700/184 |
| 2009/0164038 | A1* | 6/2009 | Bretschneider et al. | ..... 700/105 |
| 2010/0150453 | A1* | 6/2010 | Ravid et al. | .................. 382/218 |
| 2011/0015771 | A1* | 1/2011 | Guo et al. | ....................... 700/97 |

FOREIGN PATENT DOCUMENTS

| | | |
|---|---|---|
| EP | 0813130 | 12/1997 |
| EP | 1276027 | 1/2003 |
| EP | 2 189 861 A1 | 5/2010 |

* cited by examiner

450

EXPLORER SELECT Toolpath "Toolpath\1" NEW

FORM TOOLPATH

EDIT TOOLPATH "1" RECYCLE

EDIT TPPAGE TPUDS

EDIT USERPAR toolpath '1' NAME "PM_Adaptive_Control"

EDIT USERPAR toolpath '1' TYPE 'Text'

CREATE USERPAR toolpath '1'

EDIT USERPAR toolpath "1" "PM_Adaptive_Control" 'On'

EDIT TOOLPATH "1" REAPPLYFROMGUI

Fig. 5

| Extension | Active control | Quality level | Alarm behavior |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

| Extension | Active control | Quality level | Alarm behavior |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

Fig. 11

| Extension | Active cntrol | Quality level | Alarm behavior |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

Fig. 12

| Extension | Active control | Quality level | Alarm behavior |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

N49 G54
N50 CYCLE800(...)
1310 — N51 H95=02;ARTIS CADPM
1320 — N52 H93=02;ARTIS DN
1330 — N53 M131;M131 ARTIS MONITORING ON
N54 ;PMAT

......

N1166 G0 Z10.0 F=R3
1340 — N1167 M130;M130 ARTIS MONITORING OFF
N1168 M9
N1169 AXIS_SAFE ;MACRO
N1170 G0 C0 A0

METHOD AND APPARATUS FOR AUTOMATED CONFIGURATION OF A MONITORING FUNCTION OF A MACHINE TOOL

PRIORITY CLAIM

This application claims benefit of priority of German application no. 102012207916.5 titled "Method and Apparatus for an Automated Configuration of a Monitoring Function of a Machine Tool", filed May 11, 2012, and whose inventors are Dirk Lange, Dirk Euhus, and Frank August Joachim Bonas.

INCORPORATED BY REFERENCE

German application no. 102012207916.5 titled "Method and Apparatus for an Automated Configuration of a Monitoring Function of a Machine Tool", filed May 11, 2012, and whose inventors are Dirk Lange, Dirk Euhus, and Frank August Joachim Bonas, is hereby incorporated by reference in its entirety as though fully and completely set forth herein.

TECHNICAL FIELD

The present invention refers to a method and an apparatus for an automated configuration of a monitoring function of a machine tool.

DESCRIPTION OF THE RELATED ART

Today manufacturing plants have to fulfill high requirements with respect to cost effectiveness and productivity. On the other hand, there are simultaneously also high requirements with respect to the quality of the fabricated products or work pieces. These opposing objectives can often only be fulfilled by using a large degree of automation. However, an automated production line can lead to a large quantity of scrape components in a short period if an error occurs, if the error is not detected or is not detected in time.

Machine tools are key elements in many production lines. It is therefore necessary to monitor an automated operation of a machine tool by sensor systems in real time in order to be able to quickly react and to react appropriately to the situation if an error occurs.

The state of a tool used for processing a work piece has a significant influence on the quality of the work piece to be fabricated. Moreover, the probability for a breakage of a tool increases for a strongly worn out tool. High reject rates can occur if a missing or a broken tool is not recognized or not recognized in time. In the worst case, defective work pieces or components are built into final products which can lead to large damages at the customer side.

The discussed difficulty also applies if incorrect work pieces are not detected or not detected in time and are thus processed by the production line. These work pieces have to be finally rejected at the end of the processing or are erroneously built in a final product. Therefore, it is very important to recognize such error sources in time and to remove them.

Presently, a number of devices and systems for tool monitoring already exists. These systems are based on the direct or indirect measurement of the electrical energy consumed at the chipping. For example, sensors on the basis of piezo electric quartzes can be used for tool monitoring using the indirect measurement of the torque. The sensors are arranged on the tool. This is for example described in the published patent application DE 29 06 892. The patent DE 10 2006 834 and the published patent application DE 10 2004 051 145 A1 of the applicant describe how signals which are detected on various sensors arranged on a spindle of the machine tool can be wirelessly transmitted to a stationary reception unit.

Modern systems which are used for monitoring tools and/or processes have powerful interfaces to transmit commands and data from the monitoring system to a machine tool.

Modern computerized numerical control (CNC) machine tools have programmable logic controllers (PLC) or a control system for adaptation. A monitoring system communicates via the PLC with the machine tool and transmits a portion of its control instruction set to the PLC of the machine tool using this interface.

However, the PLC of the machine tool does not know (i.e., is not aware of) a second portion of the control commands of the monitoring system. Finally, a third portion of the control commands depends on the process to be processed by the machine tool or by the work piece to be processed.

Therefore, the responsible operating staff of the machine tool (i.e. the machine operator or the work planner) has to insert additional control commands or monitoring instructions into the control program of the machine tool, in order adapt the monitoring system to the control program in order to adapt the monitoring system to the respective machining operation. This results in a significant adaptation effort for the respective control program, and is very time consuming in particular for long control programs, or even not possible. As a result, these difficulties often lead to the problem that the operating staff does not at all or does not sufficiently adapt the monitoring system to the machining process to be processed. Thus, the monitoring system is often used in a wrong mode and/or with a reduced functionality. The discussed difficulties are additionally enhanced by the trend towards a larger variety of components or work pieces and to longer control programs.

Therefore, the present invention is based on the problem to provide a method and an apparatus with which the monitoring function can be adapted as well as possible to the machining process which is to be performed on a machine tool.

SUMMARY OF THE INVENTION

This problem is solved according to a first aspect (i.e., embodiment) of the invention by a method for an automated provision of a monitoring function for a machining process performed on a machine tool, comprising: (a) analyzing a computer-aided manufacturing (CAM) program of the machining process in order to determine processing steps to be monitored by means of a postprocessor; and (b) automatically inserting at least one monitoring instruction into a control program of the machine tool by means of the postprocessor, where the control program is executed during the machining process.

In contrast to the prior art, the adjustment of a monitoring function or of a monitoring system of a machine tool for a specific machining process is not performed in a production environment, but at a location where the CAM system is running. A CAM system generates a CAM program from a three dimensional model of the work piece which describes all processing steps necessary for the manufacturing of the work piece from raw material(s). The machining process of a work piece may be completely analyzed in the CAM environment. Parallel to the analysis of the paths and velocities of the individual tools in the CAM environment, the invention may enable or implement analyzing the individual steps of the monitoring of the machining process. As a consequence of the identified critical processing steps of the machining process the monitoring system of the machine tool can carefully be adjusted to the critical steps of the machining process.

Furthermore, the defined inventive method defines a widely automated adjustment process for a monitoring function of a machining process which is performed on a machine tool. This minimizes the influence of human failure on the setting up process of the monitoring function or a monitoring system.

However, the invention does not exclude an additional manual insertion, change or deletion of one or several monitoring instructions in the control program of the machine tool at the machine tool itself.

A further aspect comprises arranging the post processor in the CAM system.

As it is already explained above, a CAM system is the preferred environment in order to perform the settings of the monitoring system for a later production process. However, it is also possible to afterwards insert the monitoring instruction(s) into the machine tool, or in a computer program, which is accordingly prepared using a widely automated process, if the control program for the machine tool is already available.

According to another aspect, the control program comprises a numerical control (NC) program which is generated by the post processor in the CAM system.

Presently, in many machine tools, a control program is used in form of a computerized numerical control (CNC) program, or briefly a NC program. However, the above described method is not limited to a specific program language either for the CAM program or for the control program.

In another aspect, analyzing the CAM program comprises executing at least one analysis script by the post processor.

Scripts are suitable tools in order to investigate a CAM program in an automated form according to predetermined criteria or conditions.

According to a further aspect, the post processor evaluates extensions of tool paths of the CAM program and/or user defined properties which are available within the tool paths of the CAM program when analyzing the CAM program.

The instructions for automated provision of a monitoring function can be available in a CAM program in various manners. For example, the instructions can be added in the form of add-ons or extensions in headlines of program parts of the CAM program which define tool paths. In another example, these instructions are added in the form of distinct declarations as user defined properties to the program parts of the CAM program which describe tool paths.

In a preferred aspect, the extensions of the tool paths relate to the CAM program and/or the user defined properties which are available in the tool paths of the CAM program concerning a mode of operation of the monitoring system and/or a quality set up of the monitoring system and/or concerning generation of an alarm event.

According to a further aspect, the mode of operation activates or deactivates the monitoring system. According to another aspect, the mode of operation activates or deactivates a passive monitoring mode or an active adaptive monitoring mode.

Apart from the monitoring of the processing step, the primary focus of the monitoring system when in an active adaptive monitoring mode may be the optimization of the cycle time of the machining process. In a passive monitoring mode, the monitoring system may primarily or exclusively optimize the quality control of the machining process.

According to a further aspect, the quality set up comprises several quality levels, in particular a low, a medium and a high quality level. According to a further aspect, the alarm event comprises an immediate stop of the machine tool, a delayed stop of the machine tool, and/or no stop of the machine tool. In a further aspect generating of an alarm event comprises forwarding the alarm event from the monitoring system to the machine tool.

In one implementation example, extensions of the tool path of the CAM program and/or the user defined properties which are available in the tool path of the CAM program comprise production specifications and/or parameter values for determining at least one setup of the monitoring system.

In many of the aspects described above, the monitoring system obtains its setups by monitoring instruction(s) in the control program of the machine tool and simply executes these instructions. In the aspect described in the previous paragraph, however, the monitoring system is instructed to determine its set ups from provided parameter values and/or from production specifications.

Further, extensions can be added to the tool paths or program lines of the CAM program when generating the CAM program from CAD data. According to a further aspect, the control commands or instructions for the monitoring system are added to the CAM program as user defined properties which are available in the tool paths of the CAM program when the CAM program is generated.

As explained above, in some embodiments, all processing steps to be performed at or on a work piece are analyzed when generating the CAM program. Therefore, it is beneficial to simultaneously determine the function of the monitoring system for the respective processing step when analyzing the processing steps of the manufacturing process. Thus, an optimal synchronization of the machining process and the monitoring function can be secured.

According to another aspect, the extensions of the tool paths and/or the user defined properties which are available in the tool paths of the CAM program are selected from a first library.

There are several approaches that may be used to insert the instructions for setting up the monitoring system in a CAM program. For example, it is possible to store the various extensions belonging to respective set ups of the monitoring system in a library. Apart from the path movement of the tools, the requirements of the production process may also be analyzed when generating the CAM program. The suitable extension and/or user defined property may be selected from the first library and added as extension to the program portion which describes the respective tool path or may be inserted as a distinct program line(s) in the respective tool path of the CAM program.

In a further beneficial aspect, the area of application of the fabricated work piece restricts the selection of the extensions and/or of the user defined properties from the first library.

Depending on the area or the area of application of the work piece (for example, medical field, automotive field, or aerospace field), there are different fabrication specifications for the respective manufacturing process. These specifications can be stored in the first library and lead to a consideration of the respective manufacturing specification by the machine tool and the associated monitoring system using a respective selection of the extensions and the user defined properties.

In still another preferred aspect, a mode of operation and/or a tool restrict the selection of extensions and/or of user defined properties from the first library.

Different kinds of processing, such as, for example, drilling, cutting, or thread cutting, have different requirements regarding the mode of operation of the monitoring system. In some embodiments, these requirements may also be stored in the first library and may be communicated to the monitoring system of the machine tool by selecting a respective extension for a tool path of the CAM program and/or by user defined properties which are available in a tool path of the CAM program.

According to a further aspect, progress within a processing step restricts selecting extensions and/or selecting user defined properties from the first library (or another library).

A processing step of a machining process is often executed in several subsequent sub-steps, as for example a roughing and a subsequent finishing. The requirements to the monitoring function may be different for the two sub-steps. As described above, the different requirements may also be stored in a library, e.g., the first library.

According to a further aspect, extensions and/or user defined properties of the CAM program are automatically generated or manually added.

As explained above, an extension and/or a user defined property may be selected from the first library and automatically added as an add-on or an extension to a respective tool path of a CAM program, or the user defined property can be inserted as a distinct program line into the CAM program.

Alternatively, the person monitoring or performing the generation of a CAM program may insert the extensions and/or the user defined properties for manually setting up the monitoring system in the generated tool path of the CAM program. In the process, the person may have recourse or access to the above described library and/or may rely on his expert knowledge. Moreover, it is also possible to automatically insert a portion of the extensions and/or the user defined property in the CAM program during its generation, and manually add another portion at a later time.

In still another aspect, inserting at least one monitoring instruction into a control program of the machine tool comprises executing at least one insertion script by the post processor.

According to a further aspect, inserting the at least one monitoring instruction into the control program comprises inserting at least one H function and/or at least one M function into the control program.

In the above mentioned aspect, the control program comprises an NC program in form of G code. The G function of the G code describes incremental movements of the coordinate axis, i.e. one or several x/y and/or z axis. The M function or H function describes action codes. These functions can be used for setting up or synchronizing a monitoring system with a machining process executed on a machine tool.

According to a further aspect, inserting at least one instruction comprises inserting at least one H function and/or at least one M function at the beginning of a machining process step and removing the at least one H function and/or the at least one M function at the end of the machining process step.

According to another aspect, an extension and a user defined property of the CAM program is uniquely associated with at least one monitoring instruction for the insertion into the control program of the machine tool.

Using the unique association, the settings of a monitoring system of a machine tool may already completely be fixed in the CAM program. An adaptation of the control program to the machine tool may no longer be necessary. In still a further aspect selecting the at least one monitoring instruction is made from a second library which unambiguously associates an extension and/or a user defined property of the CAM program with at least one monitoring instruction for being inserted into the control program of the machine tool.

One possibility to image extensions and user defined properties of CAM programs which describe configuration data of a monitoring function or of a monitoring system of a machine tool includes storing them into monitoring instructions of control programs for machine tools which can be stored in a second library. In one example, an analysis script identifies an extension in a respective tool path of a CAM program and forwards the identification of the extension to the insertion script. The insertion script selects from the second library at least one monitoring instruction and inserts the monitoring instruction into the control program. Additionally, or alternatively, the analysis script recognizes a user defined property which is available in a tool path of the CAM program, and the insertion script selects from the second library the associated monitoring instruction(s) and adds these monitoring instructions into the control program of the machine tool.

According to an alternative aspect, determining the at least one monitoring instruction is made by an external application program.

For example, an external application program, such as, for example, a direct link library (DLL), may calculate the monitoring instruction(s) associated with an extension and supply the monitoring instruction to the post processor of the CAM system. The application program may be executed by a processor of the CAM system, or may run on a processor of another computer system.

According to a further aspect, the at least one monitoring instruction instructs the monitoring system to determine settings of the monitoring system from instructions of the control program and/or from parameter values which are transmitted with the at least one monitoring instruction.

In many of the aspects discussed above, the monitoring system receives its settings or configuration data from monitoring instruction(s) which are inserted in the control program of the machine tool. Thus, the monitoring system acts as a slave of the control program of the machine tool. On the other hand, in the alternative example described in the previous paragraph, the monitoring system receives via the monitoring instruction commands to determine its settings for monitoring the processing process from the instructions of the control program directed to the machine tool and/or from the provided parameter values by itself. For this purpose, the monitoring system may comprise a processor which can read and interpret instructions of the control program. Furthermore, the monitoring system may comprise a non-volatile memory in order to determine the settings of the monitoring system from instructions or algorithms stored in the non-volatile memory.

According to still a further aspect, the at least one monitoring instruction delivers limiting values for a variation range for at least one quantity used by the monitoring system for monitoring. According to a further aspect, the limiting values comprise a fixed lower and/or a fixed upper limiting value, or a lower and/or an upper envelope curve.

A beneficial aspect further comprises setting up control properties of the monitoring system according to targets which are delivered by the at least one monitoring instruction to the monitoring system.

On the basis of the obtained targets, the monitoring system may optimally configure itself for the machining process running on the machine tool.

A beneficial aspect further comprises activating tool related settings on the basis of tool numbers which are transmitted by at least one monitoring instruction to the monitoring system. Therefore, a tool specific setting of the monitoring system may be realized. Thus, the monitoring system using disadvantageous measurement quantities or derived quantities for monitoring the machining process may be avoided. A beneficial aspect further comprises activating processing specific settings on the basis of the processing type which is transmitted by the at least one monitoring instruction to the monitoring system. Thereby, the best suited quantity (measurement quantity or derived quantity) may be used for monitoring a specific machining process as for example a cutting process.

In a further beneficial aspect, an apparatus for an automated provision of a monitoring function for a machining process which is to be performed on a machine tool comprises: (a) means for analyzing a computer-aided manufacturing (CAM) program of the machining process by means of a postprocessor in order to determine processing steps to be monitored, and (b) means for automatically inserting at least one monitoring instruction into a control program of the machine tool by means of the postprocessor, where the control program is executed during the machining process.

According to a further aspect, the means for analyzing the CAM program and means for inserting at least one monitoring instruction comprise a processor. According to another aspect, the processor is arranged in a CAM system. In still a further aspect, the processor generates the control program for the machine tool from the CAM program by executing the post processor.

In a beneficial aspect, the above indicated apparatus is adapted to execute a method according to one of the above discussed aspects.

Finally, in a particularly preferred aspect, a computer program comprises program instructions for executing or implementing a method for an automated provision of a monitoring function for a machining process according to any of the above indicated aspects and embodiments. The program instructions may be stored in or on a non-transitory computer accessible memory medium, and executable by a processor to perform the method.

BRIEF DESCRIPTION OF THE DRAWINGS

In the following detailed description presently preferred examples of the present invention are described with reference to the associated figures, wherein:

FIG. 5 represents a table which lists extensions for the three characteristics active control, quality level, and alarm behavior;

FIG. 10 represents the portion of the table of FIG. 5 from which extensions can be selected for monitoring a previously certified process (white background, black type);

FIG. 11 shows the portion of the table of FIG. 5 from which extensions can be selected for setting a monitoring system if the primary target of the monitoring of the processing step is minimizing its cycle time (white background, black type);

FIG. 12 represents the portion of the table of FIG. 5 from which extensions can be selected for monitoring a thread drilling process (white background, black type); and FIG. 13 shows a segment of a control program of a machine tool at which four program lines with monitoring instructions are inserted into the control program due to an extension with the identifier 02 in the table of FIG. 5.

Figure 1:
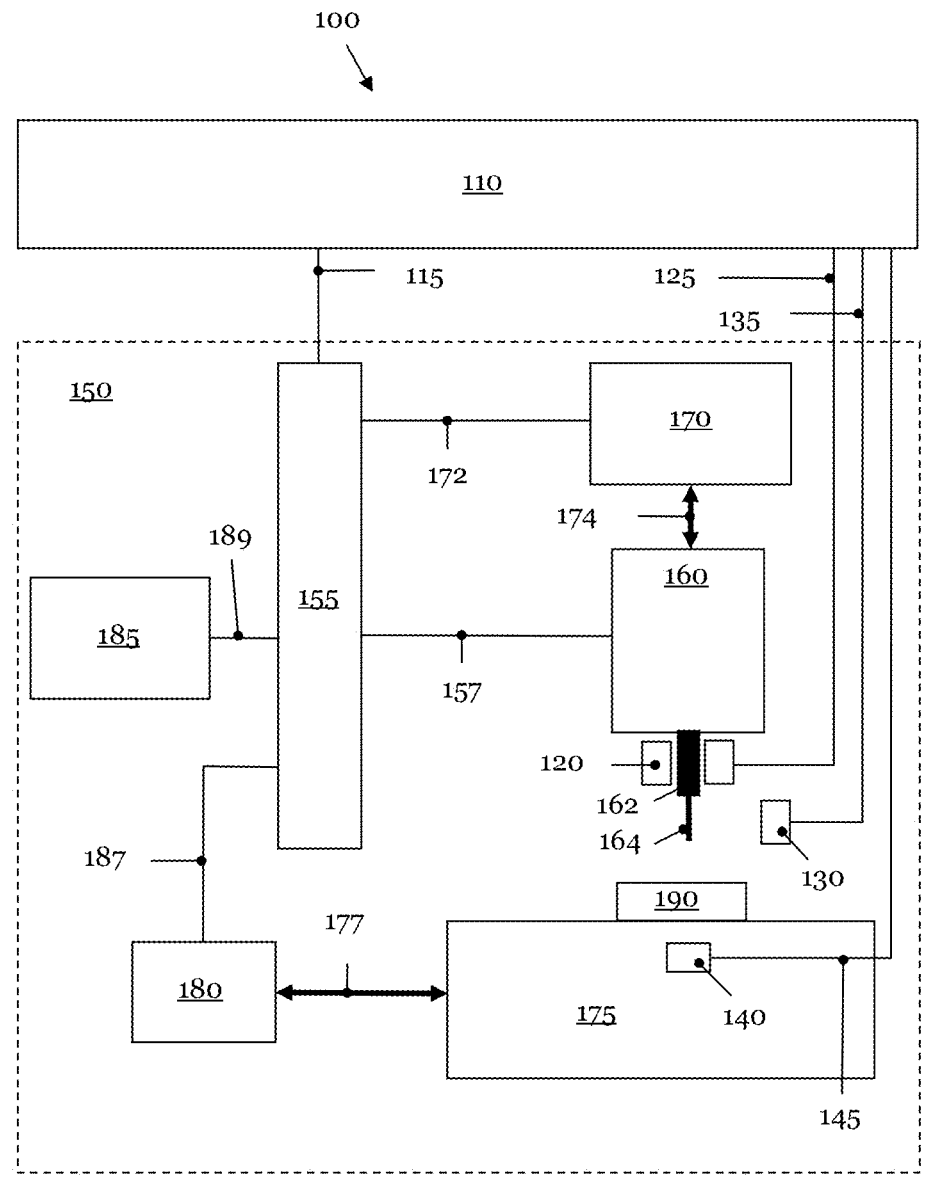
FIG. 1 shows a schematic representation of some important components of a machine tool, a work piece and a monitoring system according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the following, presently preferred implementation examples of the inventive method and the inventive apparatus for an automated provision of a monitoring function for a machining process executed by a machine tool are explained in detail. These exemplified explanations are described in the context of a machine tool with a spindle. However, the described method can also be used in or with respect to any type of machine tool.

FIG. 1 shows a combination 100 of a monitoring system 110 and some important components of a machine tool 150. The machine tool 150 has a main drive 160 with a spindle 162. The tool mount of the spindle holds the tool 164. In the example represented in FIG. 1, the spindle 162 holds a cutter 164. However, the tool 164 of the machine tool 150 is not restricted to the application of a cutter 164. Rather, the tool mount of the spindle 162 can pick up all kinds of rotating tools 164, as for example drills, broaching tools, or thread drills (not shown in FIG. 1).

The main drive 160 is moved by a first feed drive 170 in vertical direction which is also denoted as z axis in the following. This is indicated in FIG. 1 by the vertical arrow 174.

The tool 164 is directed toward the work piece 190 to be processed which is arranged on a movable work bench 175, or a slide of the machine tool 150. All known clamping devices can be used to fix the work piece 190 on the work bench 175. The defined method does not have any restrictions with respect to the work piece 190 to be processed. Rather, the method described herein can be applied to all kinds of work pieces 190.

The work bench 175 or the slide is moved by a second feed drive 180 in the horizontal direction in a controlled manner. The arrow 177 in FIG. 1 indicates the direction of the movement of the work bench 175.

The machine tool 150 is controlled or regulated by a programmable logic controller (PLC). A control program for the machine tool 150 which is in the following described in detail runs in the PLC 155.

Via the connection 157 the PLC 155 outputs signals to the main drive 160 for controlling for example a predetermined speed of rotation of the tool 164. At the same time, via the connection 157 the PLC 155 can receive data from the main drive 160 with respect to an actual (i.e., a measured) speed of rotation of the tool 174, and with respect to the energy consumed by the main drive 160.

Furthermore, the PLC 155 controls the first feed drive 170. Similar to the main drive 160 via the connection 172, the PLC 155 can receive data from the first feed drive 170 via the connection 172 which characterize the actual power consumption and the angular position of the feed drive 170.

In detail, the PLC 155 does not control the main drive 160 and the feed drive 170, but rather, a control program running in the PLC 155. In modern machine tools, this control program is often a numerical control (NC) or a computer supported numerical control or a CNC (computerized numerical control). In the following, this discrimination is dispensed.

Finally, the second feed drive 180 for the work bench 175 which is controlled by the PLC 155 via the connection 187 operates similarly to the first feed drive 170 indicated above.

PLC 155 can visibly indicate data which the PLC 155 has received from the main drive 160 and the feed drives 170, 180 or settings which are predetermined via a connection 189 on the control panel or on the operator terminal 185. The machine operator starts and stops the machine tool 150 via a keyboard arranged at the control panel 185 (not represented in FIG. 1). The machine operator or a work planner can further make changes in the control program running on the machine tool via the keyboard of the control panel 185, and can thus influence the flow of the machining process and its monitoring.

In the example illustrated in FIG. 1, the monitoring system 110 has three sensors which measure data which allows controlling the machining process to be performed on the machine tool 150.

The sensor 120 monitors the torque of the spindle 164 and sends measurement data to the monitoring system 110 via the connection 125. As already indicated in the introductory section above, the sensor 120 can be made using piezo-quartzes which are attached on the tool 164.

The sensor 130 measures the forward speed 174 of the first advanced feed 170. Furthermore, a third sensor arranged at the work bench 175 detects the mechanical vibration generated by the machining process (a cutting process in the example of FIG. 1).

The sensors 120, 130 and 140 transmit their measurement data via the connections 125, 135 and 145 to the monitoring system 110. The connection between the sensors 120, 130 and 140 and the monitoring system 110 can be realized by means of a wire or wirelessly. A wireless data transmission between the sensors 120, 130 and 140 and the monitoring system 110 is preferred whenever possible. In this design no wires restrict the movements of the various parts of the machine tool 150 and furthermore connection wires cannot be damaged or destroyed.

In the simplest implementation, the monitoring system 110 delivers the measurement data of the sensors 120, 130 and 140 via the connection 115 to the PLC 155 of the machine tool 150, which can then indicate all or a portion of the data via the control panel 185 to a machine operator of the machine tool 150.

Typically, the monitoring system 110 processes the measurement data received from the sensors 120, 130 and 140. In simple cases, this can for example comprise filtering and/or amplifying the measurement data. On the other hand, it is often necessary to derive other quantities from the measurement data of the sensors 120, 130 and 140 which are better suited for the monitoring of a specific machining process. The monitoring system 110 then outputs the derived quantities to the operation panel 185 of the machine tool 150 for displaying via the PLC 155. Often quantities characterizing the machining process are displayed in combination with admissible limiting values (see FIGS. 6-9).

The monitoring system 110 triggers an alarm if a quantity derived for monitoring a machining process from the measurement data of the sensors 120, 130 and 140 exceeds a limiting value. An alarm can cause an immediate stop of the machine tool 150, i.e., the main drive 160 and the feed drives 170, 180 are immediately stopped, or only the feed drives 170, 180 are stopped. Furthermore, an alarm can cause a stop of the machine tool 150 at the end of this processing step or, for example, only cause indicating a message at its operation panel 185 for the machine operator of the machine tool 150.

In contrast with the example represented in FIG. 1, it is also possible that the monitoring system 110 comprises its own display or its own monitor on which the processed data of one or several sensors 120, 130, 140 is displayed in combination with the respective limiting values.

Figure 2:
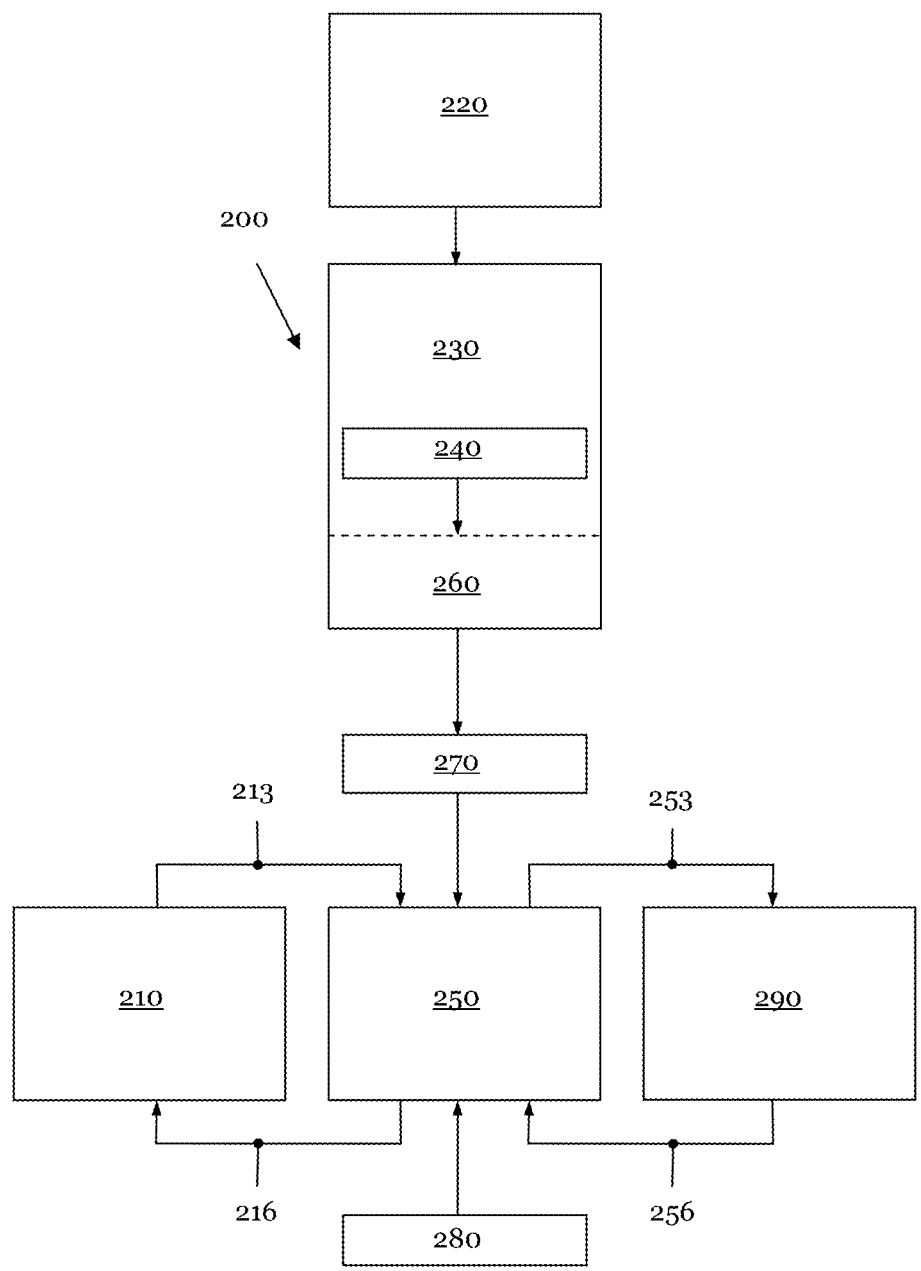
FIG. 2 schematically illustrates the generation process of a control program for a machine tool with a connected monitoring system according to the prior art.

In the following, the manufacturing process of a control program is explained for the combination of a machine tool 150 and a monitoring system 110 of FIG. 1 according to the prior art on the basis of the schematic representation of FIG. 2. In FIG. 2 the monitoring system has the reference numeral 210 and the machine tool and the machining process are characterized by the reference numeral 250 and 290, respectively.

The machine tool 150, 250 transmits via the main drive 160 and the feed drives 170, 180 a torque and feed forces 253 to the machining process 290. The machining process 290 in turn provides process forces, i.e., at least one torque and/or vibrations symbolized by the connection 256 to the sensors 120, 130, and 140, as well as to sensors available on the main drive 160 and the feed drives 170, 180 (not indicated in FIGS. 1 and 2). The machine tool 150, 250 delivers the signals of the sensors 120, 130 and 140 in FIG. 2 to the monitoring system 210 via the connections 216. The monitoring system 210 informs the machine tool 250 about fault conditions via the connection 213.

The process represented in FIG. 2 starts with the generation of a three dimensional model of the work piece 190 to be manufactured by means of a computer aided design (CAD) system 220.

The data of the three dimensional model of the work piece 190 to be fabricated are then read, often in a standardized format as for example step or IGES in a computer aided manufacturing (CAM) system 230. The planning of the machining process 290 which is afterwards to be performed by the machine tool 150, 250 is made in the CAM system by the selection and the assignment of the tools 164 necessary for the machining process 290. CAD data of the work piece 190 to be fabricated which are taken over from the CAD system 220 serves as a planning basis in this process.

The CAM system 230 generates for each tool 164 a respective path from the tool tray, the transport of the tool 164 to the operating place at the work piece 190, the actual processing step, as well as the return transport of the tool 164 to the tool tray. Apart from the path, the CAM system 230 also calculates the velocities with which the various sections of the path are passed through. The CAM system 230 further determines the speed of rotation of the tool 164 as well as the feed rates of the feed drives 170, 180 for the actual machining process at the work piece 190. The description of the path movements of all tools 164 including the respective velocities forms the CAM program 240 for the work piece 190 to be fabricated.

When the generation of the CAM program 240 is finalized, the machining process 290 of the work piece 190 to be fabricated is simulated in the CAM system.

If the simulations in the CAM system 290 have been successful, a postprocessor 260 of the CAM system 230 automatically generates the control program 270 for the PLC 155 of the machine tool 150, 250 from the CAM program 290. The control program 270 often comprises a computerized numerical control (CNC) program or simply a numerical control (NC) program or NC code, since the most often used machine tools 150, 160 are controlled or regulated by a computer logic controller (PLC) 155, as mentioned above. When necessary, the control program 270 can be stored in the CAM system 230. The control program 270 is transmitted from the CAM system 230 into the PLC 155 of the machine tool 150, 250 prior to the commencement of the machining process 290 for the work piece 190. The machine operator or the work planner responsible for the machine tool 150, 250 manually inserts one or several instructions 280 or command lines into the control program 270 of the machine tool 150, 250 which start the monitoring unit or the monitoring system 110, 210 when executing the control program 270.

It is however necessary to set up or to parameterize the monitoring system 110, 210 to the specific processing process 290 to be executed by the control program 270 so that the monitoring system 110, 210 can provide the monitoring function in a reasonable manner. For this purpose, respective instructions or program lines 280, which are in the following called monitoring instructions, have to be inserted in the control program 270 at one or several positions.

However, this is often difficult in the noisy and busy environment of a production hall in which the operating staff sometimes has significant time pressure. But even without time pressure and by suppressing the environmental noise, it is often difficult for the operating staff of the machine tool 150, 250 to have an overview of the overall machining process 290 of the work piece to be processed on site.

Additionally, it is generally mandatory for a reliable functioning of the monitoring system 110, 210 to determine which sensor signals have to be incorporated into the monitoring process. For each signal, a fluctuation interval has to be fixed which triggers a respective alarm when its limiting values are exceeded. If the interval is selected too small, there is risk to trigger false alarms. If the allowed fluctuation range is too large, the danger exists that the monitoring system 110, 210 does not detect upcoming faults. This situation often leads to the consequence that the operating staff at the machine tool 150, 250 feels that the task of setting up the monitoring system 110, 210 is too difficult. As a result, the setting and the configuration of the monitoring system 110, 210 for a specific machining process 290 is often left undone; or the parameterization is at least not done in an optimal manner. This occurs in particular for very long control programs.

Figure 3:
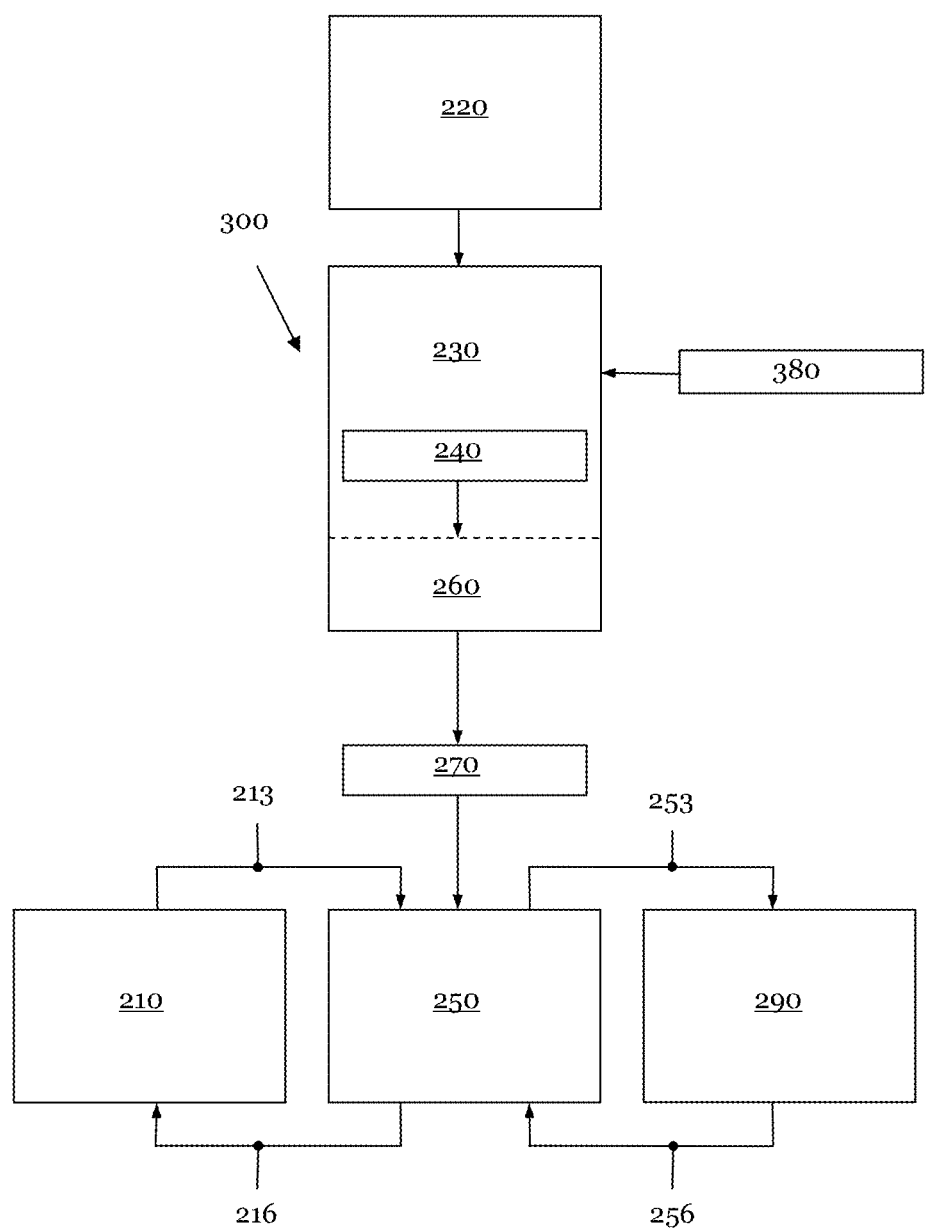
FIG. 3 schematically represents the manufacturing process of a control program for the machine tool represented in FIG. 2 according to an implementation example of the method described in the present application.

FIG. 3 schematically represents how the present invention eliminates the drawbacks of the current setting of a monitoring function or a monitoring system 110, 210, according to one embodiment. The configuration 300 of FIG. 3 reproduces the configuration 200 of FIG. 2 with the difference that the insertion of the instruction 380 for setting up the monitoring system 110, 210 does not occur in the machine tool 150, 250 itself, but in the CAM system 230. Thereby, the implementation of instruction(s) 280 for monitoring the machine tool 150, 250 is shifted from the production environment of FIG. 1 to the office environment of the CAM system 230. During the discussion of FIG. 2, it is explained that for the generation of the CAM program 240 the paths and the velocities of all tools 164 have to be determined. In the context of the comprehensive analysis of the machining process 290, it is beneficial to also investigate the monitoring of the machining process 290.

Therefore, in some embodiments, the present invention prescribes that instructions 380 for setting up the monitoring system 110, 210 are not inserted in the control program, but in the upstream CAM program 240. Then, the post processor 260 may automatically generate from the CAM program 240 a control program 270 for the machine tool 150, 250 which already comprises all instructions for a monitoring function which is optimally adapted to the respective machining process 290. Thus, input of instructions 280 for the monitoring system 110, 210 at the machine tool 150, 250 is no longer necessary.

Most of the currently used CAM systems 230 allow, apart from pure path movements, inserting additional instructions or commands in the NC program or the control program 270 of the machine tool 150, 250. The instruction lines or command lines can manually be inserted in the CAM program 240, or can be generated by means of one or several scripts and can be inserted in the NC program or the control program 270 automatically.

Figure 4:
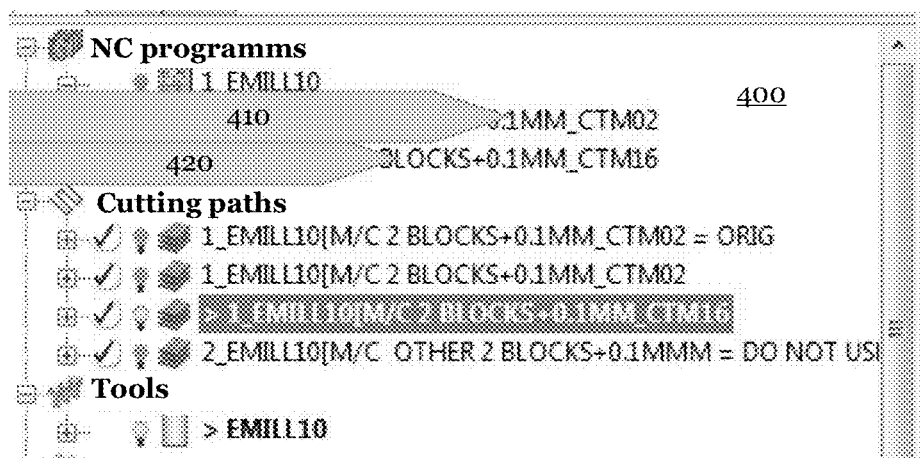
FIG. 4 represents a segment from a CAM program in which two program lines have different extensions.

FIG. 4 illustrates in a short segment of a CAM program 400 how instructions for monitoring a machining process 290 may be added or inserted into a CAM program by the monitoring system 110, 210, according to one embodiment. The add-ons or extensions 410, 420, which specify the identifiers 02 and 16 in FIG. 4, are identifiers of different instructions inserted in the CAM program 240, 400 for setting up the monitoring system 110, 210. More specifically, extensions 410, 420 are added to the tool paths of the CAM program 240, 400.

Apart from the extensions 410 and 420 of the CAM program 240, 400 which are illustrated in FIG. 4, instructions for the configuration of the monitoring system 110, 210 may also be added in form of distinct program lines, for example, in the form of user defined properties in the respective tool paths of the CAM program 240, 400 (not represented in FIG. 4).

Figure 4A:
FIG. 4a represents an example of a macro which generates the user defined property PM_Adaptive_Control for the tool path '1', and activates the user defined property by assigning the value 'on'.

FIG. 4a depicts a macro-script 450 which represents how a tool path is automatically externally associated with a new monitoring property, according to one embodiment. The macro-script 450 generates the user defined property PM_Adaptive_Control and assigns the user property the value "on".

Figure 4B:
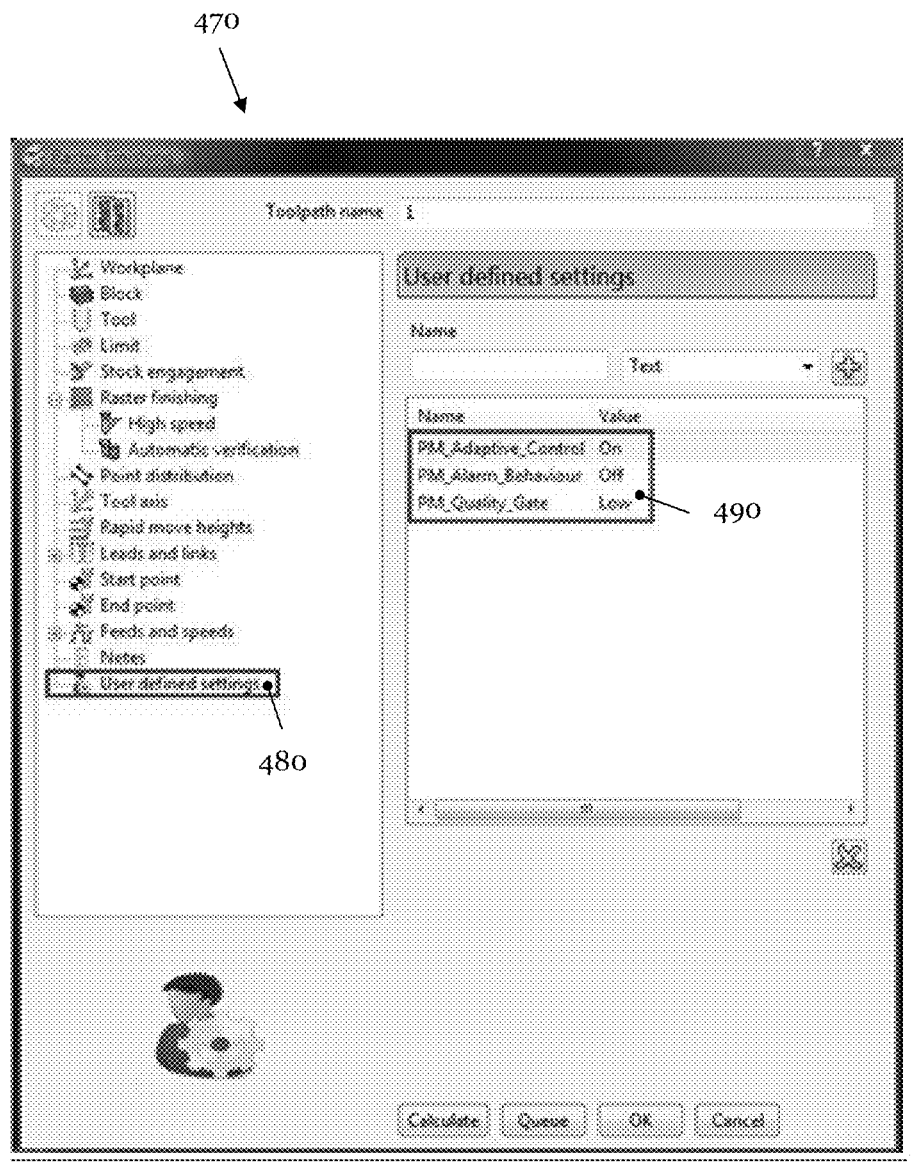
FIG. 4b illustrates a dialog surface of a CAM program in which user defined properties are indicated.

FIG. 4b illustrates how user defined properties or user defined settings can be added in a dialog interface 470 of a CAM program 400. In the example of FIG. 4b, the CAM program 400 comprises user defined settings as a sub-menu 480. The content 490 of the sub-menu 480 lists on the right side of the dialog interface 470 the user defined properties PM_Adaptive_Control, PM_Alarm_Behaviour and PM_Quality_Gate. In the represented example the first property is turned "on", the second property is turned "off", and the last mentioned user defined property is assigned the value "low".

FIG. 5 shows a table which, apart from the extensions indicated in FIG. 4 410 (with the identifier 02) and 420 (with the identifier 16), lists sixteen further extensions 410, 420 which describe further examples of configuration settings for the monitoring system 110, 210. The total 18 extensions 410, 420 or identifiers which are listed in the exemplary table of FIG. 5 comprise three different characteristics or classes of features of the monitoring system 110, 210. The feature alarm behavior in the right column of the table of FIG. 5 has three different values or reactions to an alarm determined by the monitoring system 110, 210. When an instruction occurs which causes an immediate stop of the machine tool 150, 250, the monitoring system 110, 210 causes the PLC 155 of the machine tool to immediately stop the main drive 160 as well as the feed drives 170 and 180. In a further discrimination of the instruction "stop", which is not represented in the table of FIG. 5, for example, only the feed drives 170 or 180 can be stopped, whereas the main drive 160 continues rotating the tool 164. The characteristics of the alarm behavior stop may further depend on the tool used, the machining process, and/or the progress within a processing step of the machining process 290, which is also not shown in the table of FIG. 5.

The alarm behavior "no stop" means that no alarm reaction is triggered. In a further implementation example, the alarm behavior "no stop" could, for example, cause displaying at a display of the control panel 185 of the machine tool 150 an indication that the inserted tool 162 has reached the end of its life cycle, and should therefore be replaced after a maximum of N-further uses. Furthermore, detecting the alarm behavior no stop may, for example, indicate that the temperature approaches an upper limit and/or that the temperature, level, or approach, of a cooling medium and/or a lubricant approaches a critical lower limit.

Finally, the occurrence of the delayed stop causes stopping of the machine tool 150, 250 by the monitoring system 110, 210 at the end of the current processing step or a processing sub-step of the machining process 290.

The alarm behaviors "delayed stop" or "no stop" represented in the table of FIG. 5 may have different characteristics which, for example, may depend on the used tool 164, the kind of the processing step, the progress within the processing step, and/or the work piece 190 to be processed. Therefore, the table indicated in FIG. 5 may only be a small segment of a total library or data base of identifiers or extensions 410, 420 for instructions for the configuration of the monitoring system 110, 210 for a specific machining process 290.

Figure 6:
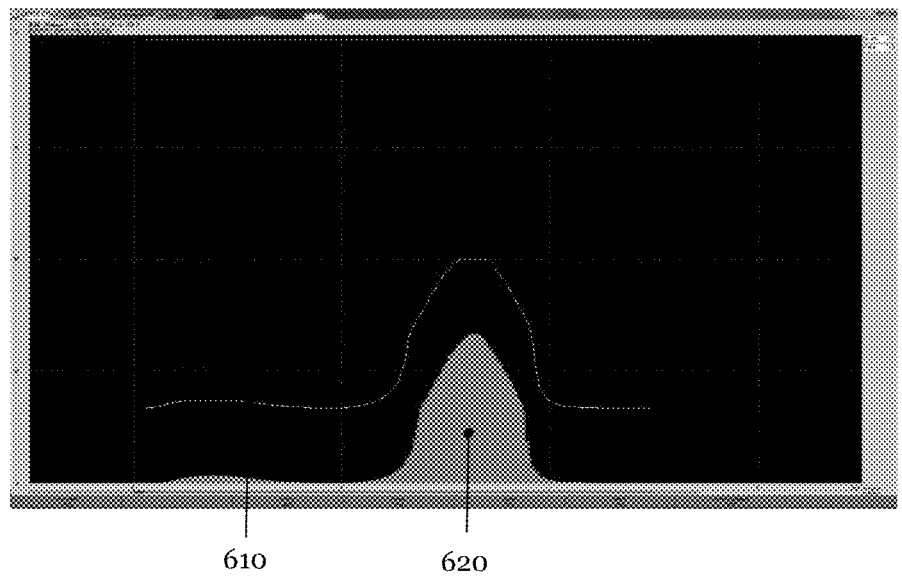
FIG. 6 represents an example of a processing step of a machining process where the quality level of the monitoring system has a low value.

The feature quality level represented in the third column of the table represented in the example of FIG. 5 comprises also three different quality levels for a processing step of a machining process 290. FIG. 6 schematically shows an exemplary processing step which is performed with the setting of a low quality level. The processing step is monitored by an upper envelope curve 610. The quantity 620 used for monitoring the processing step, such as, for example, a torque measured at the spindle 162 with the aid of the sensor 120, has a large distance to the envelope curve 610 on each position. Thus, a larger variation of the height of the torque during the processing step would not lead to triggering an alarm represented in FIG. 6.

Figure 7:
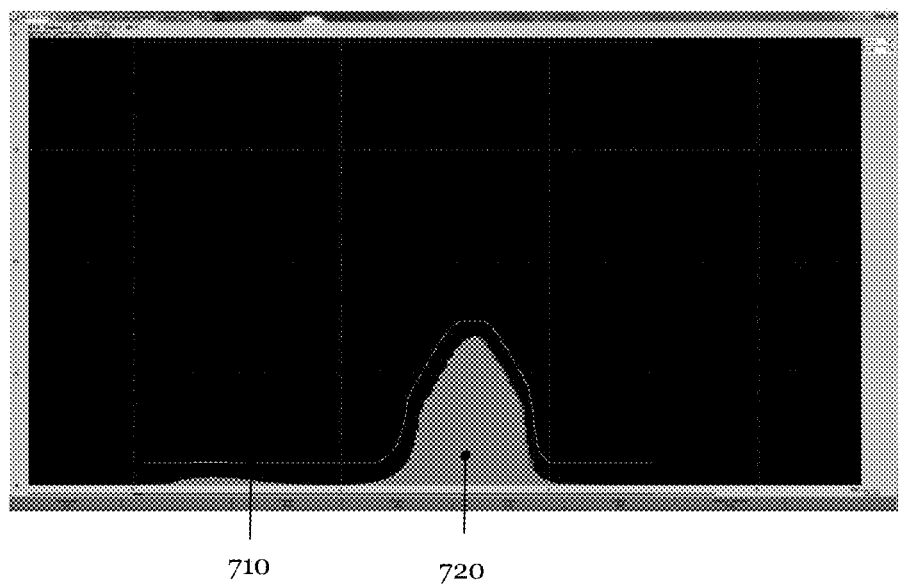
FIG. 7 shows the machining process of FIG. 6 at which the quality level of the monitoring system has a high value.

FIG. 7 illustrates an exemplary processing step where a high quality level is adjusted at the monitoring system 110, 210. The upper envelope curve 720 has only a small distance from the quantity 720 used for monitoring the processing step. As the processing step represented in FIG. 7 has the expected progress, the configuration of the monitoring system 110, 210 with a high quality level does not lead to an alarm situation.

Furthermore, the feature quality level in the table of FIG. 5 has a mean quality level which is between the quality levels indicated in the FIGS. 6 and 7.

The division of the feature quality levels into three levels is exemplary only. Of course, it is also possible to have a division into more or less levels. Additionally, as explained with respect to the example(s) of the alarm behavior, it is also possible to make the divisions dependent on the feature quality level of the processing step to be performed, the kind of process, and/or the work piece 190 to be processed, to mention only a few examples.

In some embodiments, the feature "active control" indicated in the second column of the table of FIG. 5 may be turned on or turned off. The status of active control "turned on" is in the following also called active adaptive monitoring mode, and the status of active control "turned off" is in the following also denoted as passive monitoring mode.

Figure 8:
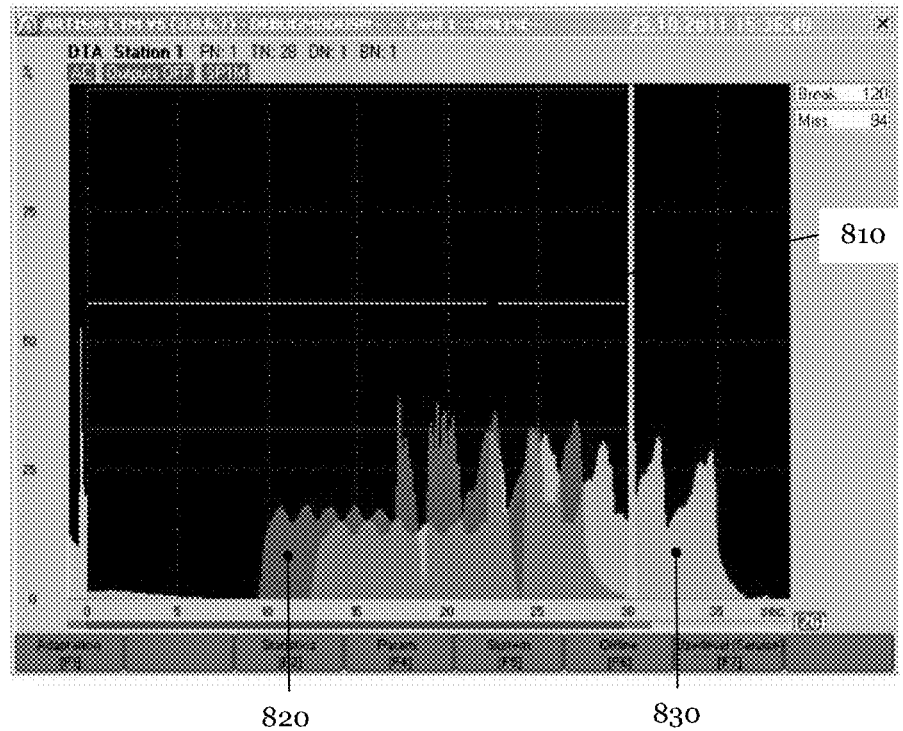
FIG. 8 represents an example of a processing step of a machining process which is performed having active control switched on and which is monitored by means of a constant upper limiting value.

FIG. 8 shows an example of a processing step of a machining process 290 for a work piece to be fabricated which is performed with active control turned on. The processing step is exclusively monitored by a fixed upper boundary value 810 which is selected to be very high. The form of the curves 820 and 830 represents two different examples of a quantity used for monitoring which have been acquired during the execution of a processing step. As can be seen from the different start and end points of the form of the curves 820, 830, the processing step performed in the active adaptive monitoring mode has a shortened cycle time.

Figure 9:
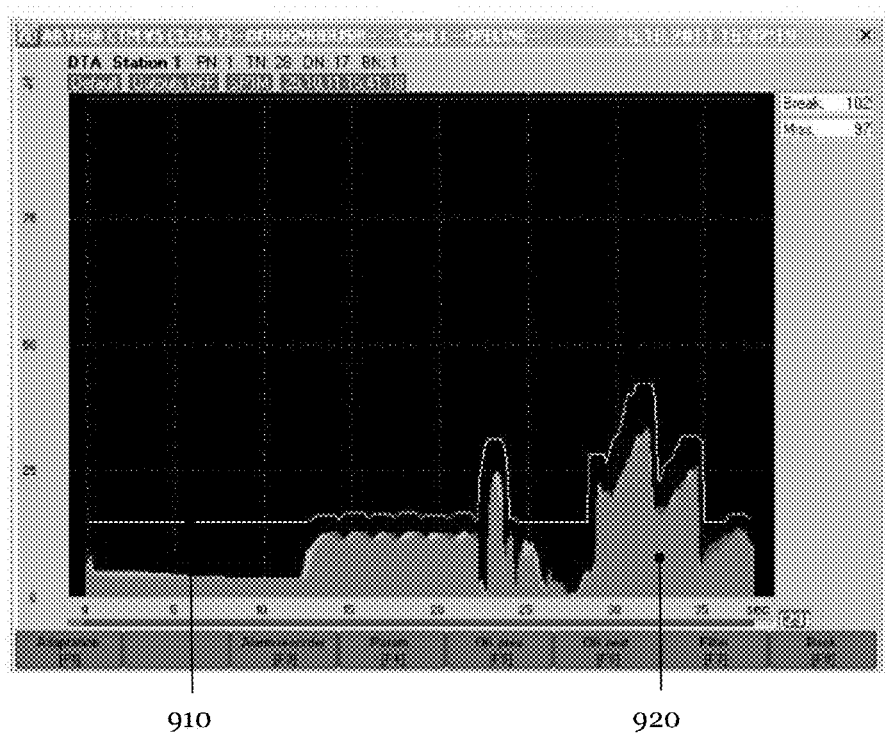
FIG. 9 represents the processing step of FIG. 8 if the active control is switched off and the processing step is controlled by means of an upper envelope curve and a high quality level.

Similar to FIG. 8, FIG. 9 shows three different exemplary processing steps of a machining process 290 where the active control is turned off, i.e., the passive monitoring mode is turned on. Furthermore, in contrast to FIG. 8, the processing step is not monitored by a time invariant upper limit 810, but by an upper envelope curve 910 with a high quality level. The three processing steps 920, 930 and 940 represented in FIG. 9 have only a minimal temporal variation. Furthermore, the height of the quantity used for monitoring only slightly varies between the three courses of the curves 920, 930 and 940 representing repetitions of the processing step.

The active adaptive monitoring mode represented in FIG. 8 and the passive monitoring mode illustrated in FIG. 9 have opposite objectives. The primary target of the active adaptive monitoring mode is to minimize the cycle time of the processing step. In turn, larger variations in the temporal behavior of the quantity used for monitoring are accepted. On the other hand, the passive monitoring mode has the objective to keep the variation between the individual executions of the monitored processing step as small as possible. The cycle time of the processing step represented in FIG. 8 is approximately 20% lower compared with the execution of the passive monitoring mode shown in FIG. 9.

Application fields exist in which the active adaptive monitoring mode cannot be used for a work piece 190 to be fabricated. The aerospace industry is an example of this. In the aerospace industry a certified process is not allowed to be changed anymore. As illustrated in FIG. 10, this criterion halves the number of the admissible identifiers or extensions 410, 420 of the table represented in FIG. 5. The identifiers or extensions 410, 420 having the identifiers 01 to 09 10 indicate that the active adaptive monitoring mode is not allowed in this case.

On the other hand, there are fields of application or technology areas which are subject to enormous economic pressure. In these fields of application, a cycle time which is as short as possible for each individual processing step of the machining process 290 is of highest priority. The automotive industry is an example for this application field. In this case, it is necessary to work with an active adaptive monitoring mode. FIG. 11 symbolizes the portion of the table of FIG. 5 from which extensions 410, 420 can be selected for setting up the monitoring system 110, 210.

The feature "active control" is digital (or binary, or Boolean) in the table represented by FIG. 5, i.e., it has only two values or conditions. However, it is also possible that for each application range or each application field of the work piece 190 to be fabricated a distinct identification of the feature is required. Thus, the number of lines in the table of FIG. 5 would respectively multiply (not shown in FIG. 5), i.e., be greater.

In addition to the application fields of the work piece 190 to be fabricated, the kind of machining process 290 may also influence the configuration of the monitoring system 110, 210. For example, for a thread drilling process, the occurrence of a fault which triggers an alarm to immediately stop the machine tool 150, 250, the main drive 160 and its feed 170 may not be immediately stopped. The tap and die would break when again starting the main drive 160 and the feed 170 for removing the tap and die from the work piece 190. As a result, FIG. 12 shows that the thread cutting process may only be executed with a single extension 410, 420 or exclusively with the identifier 18 of the table of FIG. 5.

The table of FIG. 5 has three features, wherein two of these features each can have three different values. One feature (active control) has two values. In total, the table of FIG. 5 thus comprises eighteen (2×3×3) different combinations of the three features. Apart from the three features listed in the table of FIG. 5, it may, however, also be necessary or desirable to use further quantities for setting up the monitoring system 110, 210. As already briefly mentioned with reference to FIG. 12, the kind of processing may have a significant influence on the configuration or parameterization of the monitoring system 110, 210. Therefore, the kind of processing may be added as a distinct feature in the table of FIG. 5 (not shown in FIG. 5).

As explained above with respect to the example of FIG. 12, the type of tool may also influence the configuration of the monitoring system 110, 210. Furthermore, a varying quantity of the tool 164 may require a corresponding adaptation of the monitoring of a processing step. For example, a tactile analysis of a large tool may be suitable for determining an available tool 164, whereas the application of this investigation method to a small tool 174 may result in the danger of damaging or even destruction of the tool 164. However, this danger does not exist when using non-contact analysis methods. Therefore, it may be useful to add the type of tool and/or the size of the tool as further independent features in the table of FIG. 5, which summarizes different setting options of the monitoring system 110, 210 in form of extensions 410, 420 for a CAM program 240, 400.

Moreover, the progress within the processing step of the machining process 290 may require changes in the settings of the monitoring system 110, 210. For example, a first coarse partial removal in a cutting process step may be performed with no monitoring or by only using a monitoring by means of a fixed upper limiting value (see FIG. 8). On the other hand, the subsequent sub-step for generating a predefined surface contour of the work piece 190 may require monitoring which may detect a small deviation from a predefined process behavior.

As a result, the table of FIG. 5 only represents a small section of a complete library of setting options for the monitoring system 110, 210.

In a possible sequence of the generation of a control program 270 for the machine tool 150, 250 and the monitoring system 110, 210 connected to the machine tool 150, 250, a script or an analysis script which is, for example, executed by the processor of the CAM system 230 may analyze CAM program 240, 400 and add extensions 410, 420 to the respective program lines of the CAM program 310, 420 on the basis of the table of FIG. 5, or more generally, by selecting extensions 410, 420 from a library. Alternatively or parallel to this process, an analysis script may insert distinct program lines in the CAM program 240, 400 (not shown in FIG. 4), which describe setting options of the monitoring system 110, 210. The program lines may determine user defined properties which are inserted into the program portions of the CAM program 240, 400 which describe respective tool paths.

The postprocessor 260 generates a control program 270 for the machine tool 150, 250 in automated form as schematically represented in FIG. 3. Parallel or sequentially to the postprocessor 260, for example, an insertion script may identify the extensions 410, 420 of the CAM program 240, 400 and insert one or several monitoring instructions into the control program 270 for the machine tool 150, 250 which configure the monitoring system 110, 210 for the machining process 290.

FIG. 13 shows a segment of a control program 1300 which refers to the extension 410 of the CAM program 400 of FIG. 4. The impact of the extension 410 with the identifier 02 has been extensively described above during the discussion of the table of FIG. 5. In the example of FIG. 13, the extension 410 with the identifier 02 causes the insertion of four machine specific monitoring instructions 1310, 1320, 1330, and 1340 into the control program 1300. The monitoring instructions 1310-1340 are highlighted in black in the program segment 1300 of FIG. 13. The other instructions of the program segment 1300 which refer to the control of the machine tool 150, 250 are shaded in gray in FIG. 13.

The monitoring instructions 1310 and 1320 describe instructions of the H function and specify the configuration with which the monitoring is to be performed.

The M function M131 of the monitoring instruction 1330 of FIG. 13 turns on the active control (see second column of the table of FIG. 5) and the M function of the monitoring instruction 1340 turns off the active control at the end of the processing step of the machining process 290.

The allocation of the monitoring instructions 1310, 1320, 1330, 1340 to the extensions 410, 420 (with the identifiers 01 to 18 in the table of FIG. 5) of the CAM program 240, 400 may be stored in a further or a second library to which the postprocessor 260 or the insertion script has access. Alternatively, an application program running on the processor of the CAM system 230 may determine the associated monitoring instructions 1320, 1340 from the identified extensions 410, 420 of the CAM program 240, 400. Instead of, or in addition to, running on the processor of the CAM system 230, the application program may also be executed on an external processor or computer system. Finally, it is also contemplated to receive a portion of the monitoring instructions 1310-1340 from a library and to determine a second portion by means of an application program as explained above. The application program may, for example, be executed in form of a dynamic link library (DLL).

In many of the implementation examples of a method defined above, the monitoring system 110, 210 obtains detailed instructions by means of the monitoring instruction(s) 1310-1340 of the control program 270, 240 as to how it has to perform the monitoring of the individual processing steps of the machining process 290. Following the monitoring instructions 1310-1340, the monitoring system 110, 210 may execute the predetermined settings and subsequently monitor the individual processing steps of the machining process 290.

However, modern monitoring systems 110, 210 may have a distinct processor and a non-volatile memory (not shown in FIG. 3). Thus, modern monitoring systems 110, 210 may be able to partially determine the settings or configuration data for themselves.

In an alternative demonstration for providing a monitoring function, it is possible to transmit parameter values in the extensions 410, 420 of the CAM program 240, 400 for setting up the monitoring function as well as transmit instructions to the monitoring system 110, 210 in order to analyze the respective portion of the control program 270, 1300. The monitoring system 110, 210 itself may determine the respective settings for the individual processing steps for the machining process 290 on the basis of these specifications. For example, the instructions 1310-1340 stored in the control program 270, 1300 for moving an axis (for example the feed drive 170 of the main drive 160 in FIG. 1) may lead to a signal selection of this axis (C axis) for the monitoring. For this purpose, the postprocessor 260 may translate the extensions 410, 420 of the CAM program 240, 400 into machine specific instructions 1310-1340 of the control program 270, 1300.

For example, the kind of movement of each axis of the machine tool 150, 250, such as positive fast (Go), positive slow (Gx), no movement (Gx), negative slow (Gx), and finally negative fast (Go), may be stored in a mask in the monitoring system 110, 210 and may be helpful when analyzing the respective portion of the control program 270, 1300 by the monitoring system 110, 210. Similar masks or tables for other functions of the monitoring system 110, 210 may be stored in the monitoring system 110, 210 and may be applied for analyzing the control program 270, 1300.

The monitoring system 110, 210 may determine or specify a monitoring process with wide limits, such as, for example, a fixed upper limit 810 indicated in FIG. 8 from a rough machining sub-step (scrubbing) for the machine tool 150, 250 arranged in the control program 270, 1300.

On the other hand, a respective fine machining sub-step (finishing) may lead to the determination or specification of a monitoring process with narrow limits by the monitoring system 110, 210, which is exemplarily illustrated by the upper envelope curve 710 of FIG. 7 and 910 of FIG. 9.

The limits employed for monitoring (for example fixed upper and/or fixed lower limits or lower and/or upper envelope curves) may be transmitted to the monitoring system 110, 210 as limiting values or as parameter values in the monitoring instructions 1310-1340. In the last mentioned case, the monitoring system 110, 210 determines the limiting values used for monitoring from the parameter values.

Furthermore, the type of tool used and/or the size of the used tool 164 may also be transmitted by means of tool numbers to the monitoring system 110, 210. The type of machining as well as the progress within a processing step (such as rough machine sub-step or scrubbing and fine machining or finishing, respectively) may be transmitted to the monitoring system 110, 210 in form of a part number key.

Moreover, it is also possible to transmit parameters for the control properties of the monitoring system 110, 210 via extensions 410, 420 of the CAM program 240, 400 and inserted monitoring instructions 1310-1340 of the control program 270, 1300. The monitoring system 110, 210 may determine the optimal settings for the respective processing step of the machining process 290 from these specifications, for example, on the basis of an algorithm stored in its memory.

In the recently explained example, the monitoring system does not slavishly execute the monitoring instructions 1310-1340 but configures itself to a large extent on the basis of parameter values transmitted by the monitoring instructions 1310-1340 and by analyzing the control program 270, 1300. Thus, at least a portion of the data stored in the first library or the data determined by the application program may be determined by the monitoring system 110, 210 itself and thus does not have to be transmitted. Furthermore, it is also possible to realize a hybrid type between the at first described example (the monitoring system 110, 210 executes the monitoring instructions 1310-1340) and the last explained implementation example (the monitoring system 110, 210 receives parameter values and configures itself to a large extent by means of these values and the control program 270, 1300).

The method for providing a monitoring function described in the present description has at least two important benefits: (i) the settings of the monitoring function are carried out by experts in the CAM environment instead of setting up the monitoring function at the machine tool itself; and (ii) the defined function enables a setting of the monitoring function which is automated to a large extent.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for automated provision of a monitoring function for a machining process to be executed by a machine tool, the method comprising:
   a processor executing a postprocessor to perform:
   a. analyzing a computer-aided manufacturing (CAM) program of the machining process, wherein the machining process comprises a plurality of processing steps, and wherein the analyzing identifies a subset of the plurality of processing steps for monitoring operation of the machine tool utilizing one or more sensors in order to detect operational errors in the machine tool; and b. automatically inserting at least one monitoring instruction specific to the identified subset of the plurality of processing steps into the CAM program, and generating a control program for the machine tool from the CAM program, wherein the control program is executed during the machining process.

2. The method according to claim 1, wherein said analyzing the CAM program comprises executing at least one analysis script by the postprocessor.

3. The method according to claim 1, wherein said analyzing the CAM program comprises the postprocessor evaluating at least one of: extensions of tool paths of the CAM program or user defined properties which are available in the tool paths of the CAM program.

4. The method according to claim 3, wherein the extensions of the tool paths of the CAM program or the user defined properties which are available in the tool paths of the CAM program relate to at least one of: a mode of operation of a monitoring system, a quality setting of the monitoring system, or a generation of an alarm event.

5. The method according to claim 3, wherein the extensions of the tool paths of the CAM program or the user defined properties which are available in the tool paths of the CAM program are added to the CAM program from CAD data when generating the CAM program.

6. The method according to claim 3, wherein the extensions of the tool paths of the CAM program or of the user defined properties which are available in the tool paths of the CAM program are selected from a first library.

7. The method according to claim 6, wherein the machining process is applied to a manufactured work piece, and wherein an application area of the manufactured work piece restricts a selection of at least one of: the extensions or the selection of the user defined properties of the CAM program from the first library.

8. The method according to claim 6, wherein at least one of: a kind of processing or a tool restrict the selection of the extensions or the selection of the user defined properties of the CAM program from the first library.

9. The method according to claim 1, wherein said automatically inserting the at least one monitoring instruction comprises executing at least one insertion script by the postprocessor.

10. The method according to claim 1, wherein said automatically inserting the at least one monitoring instruction into the control program comprises inserting at least one H function or at least one M function into the control program.

11. The method according to claim 1, wherein each extension of the CAM program is unambiguously associated with a respective at least one monitoring instruction for insertion into the control program of the machine tool.

12. The method according to claim 1, wherein the at least one monitoring instruction instructs a monitoring system to determine settings of the monitoring system from at least one of: instructions of the control program of the machine tool or from parameter values which are transmitted by the at least one monitoring instruction.

13. The method according to claim 1, wherein the at least one monitoring instruction transfers at least one of:
limiting values for a variation range of a quantity which uses a monitoring system for monitoring; or
parameter values for determining of limiting values from which the monitoring system determines limiting values.

14. The method according to claim 1, further comprising:
setting up control properties of a monitoring system according to specifications which are transferred from the at least one monitoring instruction to the monitoring system.

15. The method according claim 1, further comprising:
activating tool related settings based on tool numbers which are transmitted to a monitoring system by the at least one monitoring instruction.

16. The method according to claim 1, further comprising:
activating process specific settings based on the kind of process, wherein the process specific settings are transmitted to a monitoring system by the at least one monitoring instruction.

17. An apparatus for automated provision of a monitoring function for a machining process which is executed by a machine tool, comprising:
a processor; and
a non-transitory memory medium, coupled to the processor, wherein the non-transitory memory medium stores program instructions implementing a postprocessor, wherein the postprocessor is executable by the processor to:
a. analyze a computer-aided manufacturing, CAM, program of the machining process, wherein the machining process comprises a plurality of processing steps, and wherein the analyzing identifies a subset of the plurality of processing steps for monitoring operation of the machine tool utilizing one or more sensors in order to detect operational errors in the machine tool; and
b. automatically insert at least one monitoring instruction specific to the identified subset of the plurality of processing steps the Cam program, and generating a control program for the machine tool from the CAM program, wherein the control program is executed by the machine tool during the machining process.

18. A non-transitory computer accessible memory medium that stores program instructions implementing a postprocessor, wherein the postprocessor is executable by a processor to perform:
analyzing a computer-aided manufacturing (CAM) program of the machining process, wherein the machining process comprises a plurality of processing steps, and wherein the analyzing identifies a subset of the plurality of processing steps for monitoring operation of a machine tool utilizing one or more sensors in order to detect operational errors in the machine tool; and
automatically inserting at least one monitoring instruction specific to the identified subset of the plurality of processing steps into the CAM program, and generating a control program for the machine tool from the CAM program, wherein the control program is executed during the machining process.

19. The non-transitory computer accessible memory medium of claim 18, wherein said analyzing the CAM program comprises executing at least one analysis script by the postprocessor.

20. The non-transitory computer accessible memory medium according to claim 18, wherein said analyzing the CAM program comprises the postprocessor evaluating at least one of extensions of tool paths of the CAM program or user defined properties which are available in the tool paths of the CAM program.

21. The non-transitory computer accessible memory medium according to claim 20, wherein the extensions of the tool paths of the CAM program or the user defined properties which are available in the tool paths of the CAM program relate to at least one of: a mode of operation of a monitoring system, a quality setting of the monitoring system, or a generation of an alarm event.

22. The non-transitory computer accessible memory medium according to claim 20, wherein the extensions of the tool paths of the CAM program or the user defined properties which are available in the tool paths of the CAM program are added to the CAM program from CAD data when generating the CAM program.

23. The non-transitory computer accessible memory medium according to claim 20, wherein the extensions of the tool paths of the CAM program or the user defined properties which are available in the tool paths of the CAM program are selected from a first library.

24. The non-transitory computer accessible memory medium according to claim 23, wherein the machining process is applied to a manufactured work piece, and wherein an application area of the manufactured work piece restricts a selection of at least one of: the extensions of the tool paths of the CAM program from the first library or the selection of the user defined properties of the CAM program from the first library.

25. The non-transitory computer accessible memory medium according to claim 23, wherein at least one of: a kind of processing or a tool restrict the selection of the extensions or the selection of the user defined properties of the CAM program from the first library.

* * * * *